March 29, 1960   H. S. VAN BUREN, JR   2,930,424
SEALING NUT HAVING FLEXIBLE SEALING LIP
Filed Oct. 18, 1956

INVENTOR:
HAROLD S. VAN BUREN JR.,
BY Robert E Ross
ATTORNEY.

United States Patent Office 2,930,424
Patented Mar. 29, 1960

2,930,424

SEALING NUT HAVING FLEXIBLE SEALING LIP

Harold S. Van Buren, Jr., Cambridge, Mass., assignor to United-Carr Fastener Corporation, Boston, Mass., a corporation of Delaware Application October 18, 1956, Serial No. 616,734

1 Claim. (Cl. 151—7)

This invention relates generally to fastening devices, and has particular reference to a sealing nut assembly which is adapted to receive a bolt in watertight engagement.

In the construction of automobiles, household appliances and the like, it is frequently desired to attach a trim molding, a name plate, or the like to a sheet metal panel, and in many cases it is desirable that such attachment be waterproof to prevent the entrance of moisture and dust to the interior of the device.

Although a number of methods have been proposed to provide a waterproof seal in such an assembly, none have proved entirely satisfactory. Most of the devices in use utilize a mastic sealing compound in the nut. However, it has been found that such devices do not provide an absolutely watertight seal about the threads of the bolt, are difficult to handle, and are expensive to manufacture.

The object of this invention is to provide a sealing nut device in which the sealing portion is adapted for rapid and economical assembly in automatic machinery.

A further object of the invention is to provide a sealing nut assembly in which means is provided to grip tightly about the threads of an inserted bolt and to squeeze between the bolt and the nut to provide a watertight seal therebetween.

A further object of the invention is to provide a sealing nut assembly in which the sealing member also provides a friction lock when the nut is assembled onto a bolt.

Other objects of the invention will be obvious to one skilled in the art from the following description of a specific embodiment thereof.

Figure 1:
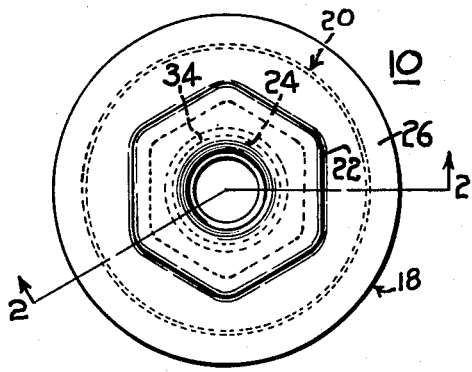
Fig. 1 is a top plan view of a sealing nut assembly embodying the features of the invention.
Figure 2:
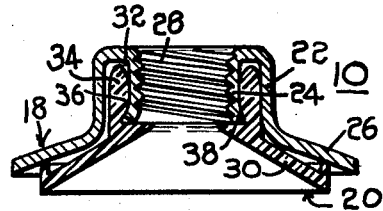
Fig. 2 is a view in section taken on line 2—2 of Fig. 1.
Figure 3:
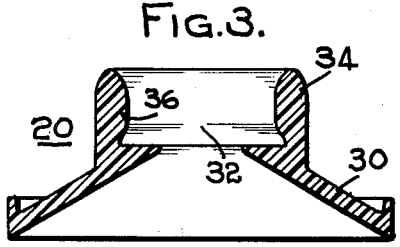
Fig. 3 is a view of the sealing member prior to assembly with the nut.
Figure 4:
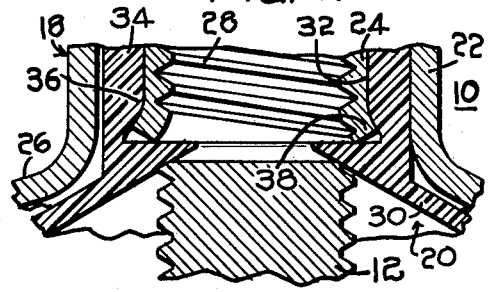
Fig. 4 is an enlarged view of a portion of Fig. 2.
Figure 5:
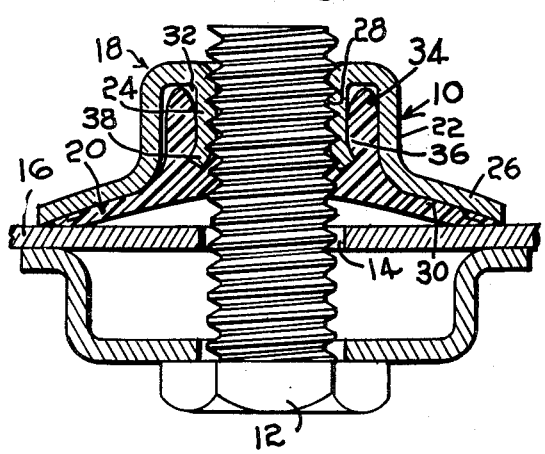
Fig. 5 is a view in section of an assembly utilizing the nut of Figs. 1–3.
Figure 6:
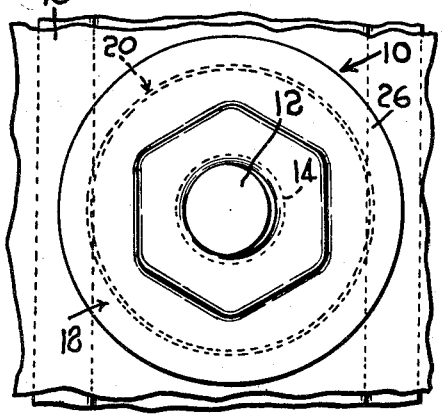
Fig. 6 is a top plan view of the assembly of Fig. 5.

Referring to the drawing, there is illustrated a sealing nut assembly 10, which is adapted to engage a bolt 12 protruding through an opening 14 in a supporting panel 16, and provide a watertight seal about the bolt.

The nut assembly 10 comprises generally a nut 18 and a sealing member 20 assembled therewith. The nut 18 comprises an outer barrel 22 shaped to receive a driving tool such as a wrench, an inner barrel 24 joined to the outer barrel at one end, and an outwardly and downwardly extending flange 26 disposed on the other end of the outer barrel. The inner barrel 24 has a central aperture 28 threaded to receive the bolt 12.

The sealing member 20 is formed of a single piece of resilient deformable material, such as synthetic organic plastic, for example, polyethylene, and comprises a body portion 30 which is generally conical, with a central opening 32, and an upstanding generally cylindrical wall 34 disposed about the opening in spaced relation thereto. The wall 34 extends upwardly into the recess, and in the illustrated embodiment the upper end of the wall has an enlarged portion 36, and the lower end 38 of the inner barrel is flared outwardly so that the sealing member is firmly retained in assembly with the nut.

The opening 32 is slightly smaller than the bolt 12 so that when the nut is assembled into the bolt, the portion of the sealing member about the opening mashes firmly into the bolt threads to provide a watertight seal between the nut and the bolt and also provides a friction lock therebetween. As the nut is tightened against the panel, the sealing device is forced firmly against the panel to provide a watertight seal about the periphery of the nut flange, and also provides a friction lock between the nut and the panel.

The nut assembly illustrated herein has been found to provide an absolutely watertight seal about a bolt onto which it is assembled, and is economical to manufacture, since the sealing device is readily adapted for assembly into the nut in automatic machines. The assembly is also easily handled without the danger of the parts striking together as is frequently the case with parts which utilize a mastic compound as the sealing agent.

Since certain obvious modifications may be made in the device without departing from the scope of the invention, it is intended that all matter contained herein be interpreted in an illustrative and not in a limiting sense.

I claim:

A sealing nut device comprising a nut having an outer barrel portion shaped to receive a driving tool, an inner barrel portion disposed within said outer barrel in spaced, substantially parallel relation therewith and secured thereto at one end thereof, the inner surface of said inner barrel portion being threaded forming an axially extending threaded central bore in the nut for receiving a threaded bolt therein, the free terminal end of said inner barrel being curved outwardly in the direction of said outer barrel portion, an outwardly and downwardly extending flange portion joined to the free end of said outer barrel portion and a flexible sealing member formed from a single piece of resilient material assembled with said nut, said sealing member comprising a barrel portion disposed in the spaced area formed by the inner and outer barrel portions of said nut, and a flange portion secured to the free end of said barrel portion, said flange portion of said sealing member being in substantial registry with the under surface of the flange portion of said nut, and a central flexible lip portion having a central aperture therein positioned adjacent the jointure line of the barrel portion and the flange portion of said sealing member and just below the terminal end of said inner barrel portion of said nut, said lip portion having a flat, top surface extending in substantially transverse relationship to the barrel portion with the under surface thereof extending in generally radially inclined relationship with respect to the top surface thereof and converging at said aperture, the barrel portion of said flexible member immediately above said lip portion having an inwardly extending recess in which the outwardly extending terminal end of said inner barrel portion of said nut engages to insure the positive assembly of said nut and said sealing member, the diameter of said aperture being less than the diameter of said inner barrel portion with the portion of said central portion surrounding the aperture therein being sufficiently flexible for engagement between the threads of the inner barrel portion at the free end thereof and the threads of an inserted bolt.

References Cited in the file of this patent

UNITED STATES PATENTS

| | | |
|---|---|---|
| 1,201,198 | Kraft | Oct. 10, 1916 |
| 1,330,594 | Kraft | Feb. 10, 1920 |
| 2,390,726 | Mitchell | Dec. 11, 1945 |
| 2,399,107 | Eckenbeck et al. | Apr. 23, 1946 |
| 2,742,939 | Larson | Apr. 24, 1956 |
| 2,761,349 | Heller | Sept. 4, 1956 |

FOREIGN PATENTS

| | | |
|---|---|---|
| 12,943 | Great Britain | May 30, 1911 |